(12) United States Patent
Hoop et al.

(10) Patent No.: US 9,821,379 B2
(45) Date of Patent: *Nov. 21, 2017

(54) DRILL BIT WITH AN EXCHANGEABLE CUTTING PORTION

(71) Applicant: Hilti Aktiengesellschaft, Schaan (LI)

(72) Inventors: Matthaeus Hoop, Eschen (LI); Christoph Weber, Neuheim (CH); Joerg Ebert, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 369 days.

This patent is subject to a terminal disclaimer.

(21) Appl. No.: 14/367,784

(22) PCT Filed: Dec. 21, 2012

(86) PCT No.: PCT/EP2012/076774
§ 371 (c)(1),
(2) Date: Jun. 20, 2014

(87) PCT Pub. No.: WO2013/093060
PCT Pub. Date: Jun. 27, 2013

(65) Prior Publication Data
US 2015/0016909 A1    Jan. 15, 2015

(30) Foreign Application Priority Data
Dec. 22, 2011  (DE) .................. 10 2011 089 546

(51) Int. Cl.
B23B 51/04    (2006.01)
B28D 1/04    (2006.01)

(52) U.S. Cl.
CPC ...... B23B 51/0466 (2013.01); B23B 51/0406 (2013.01); B23B 51/048 (2013.01);
(Continued)

(58) Field of Classification Search
CPC ............ B23B 51/0466; B23B 51/0473; B23B 51/048; B28D 1/041; Y10T 408/895
See application file for complete search history.

(56) References Cited

U.S. PATENT DOCUMENTS

| 1,855,873 A | 4/1932 | Shortell |
| 3,374,696 A | 3/1968 | Trevathan |

(Continued)

FOREIGN PATENT DOCUMENTS

| DE | 21 30 728 A1 | 12/1971 | |
| DE | 10 2011 089 546 A1 * | 6/2013 | ............... B28D 1/14 |

(Continued)

OTHER PUBLICATIONS

Chinese Office Action issued in counterpart Chinese Application No. 201280067173.4 dated Aug. 4, 2015 (Eleven (11) pages).

(Continued)

Primary Examiner — Eric A Gates
(74) Attorney, Agent, or Firm — Crowell & Moring LLP

(57) ABSTRACT

A drill bit which is rotatable about a drilling axis is disclosed. The drill bit has a cutting section having one or more cutting segments and a first plug-connecting element and a drill shaft section having a second plug-connecting element. The first plug-connecting element and the second plug-connecting element form a plug connection and the first plug-connecting element and the second plug-connecting element are connectable by a pin connection.

6 Claims, 5 Drawing Sheets

(52) U.S. Cl.
CPC .......... *B23B 51/0473* (2013.01); *B28D 1/041* (2013.01); *B23B 2251/02* (2013.01); *B23B 2251/46* (2013.01); *B23B 2251/50* (2013.01); *Y10T 408/895* (2015.01); *Y10T 408/9098* (2015.01)

(56) References Cited

U.S. PATENT DOCUMENTS

| | | | |
|---|---|---|---|
| 3,382,743 A | | 5/1968 | Trevathan |
| 3,610,768 A | * | 10/1971 | Cochran ............ B23B 51/0466 125/20 |
| 3,878,906 A | | 4/1975 | Guest |
| 3,888,320 A | | 6/1975 | Maxwell |
| 3,999,620 A | * | 12/1976 | Watson ............... B23B 51/0406 175/403 |
| 4,500,234 A | * | 2/1985 | Orth .................... B23B 51/042 408/204 |
| 4,968,192 A | * | 11/1990 | Hamilton ........... B23B 51/0466 407/33 |
| 5,451,128 A | * | 9/1995 | Hattersley .......... B23B 51/0466 407/107 |
| 6,007,279 A | * | 12/1999 | Malone, Jr. ......... B23B 51/0433 144/150 |
| 7,628,228 B2 | * | 12/2009 | Drivdahl ................. E21B 10/02 175/403 |
| 7,641,004 B2 | * | 1/2010 | Lapointe ................ B28D 1/041 175/405.1 |
| 9,120,162 B2 | * | 9/2015 | Keightley ........... B23B 51/0433 |
| 2007/0036620 A1 | | 2/2007 | Keightley |
| 2010/0200304 A1 | | 8/2010 | Gosamo et al. |

FOREIGN PATENT DOCUMENTS

| | | |
|---|---|---|
| EP | 0 314 123 A2 | 5/1989 |
| EP | 0 428 476 A1 | 5/1991 |
| FR | 2.097.340 | 3/1972 |
| KR | 10-2005-0034151 A | 4/2005 |
| WO | WO 90/15683 A1 | 12/1990 |

OTHER PUBLICATIONS

Korean Office Action issued in Korean counterpart application No. 10-2014-7017833 dated Mar. 30, 2016 (Three (3) pages).
PCT/EP2012/076774, International Search Report dated Feb. 20, 2013 (Three (3) pages).
German Office Action dated Nov. 27, 2012 (Six (6) pages).
U.S. Patent Application, "Drill Bit with an Exchangeable Cutting Portion", filed Jun. 20, 2014, Inventor Matthaeus Hoop, et al.

* cited by examiner

DRILL BIT WITH AN EXCHANGEABLE CUTTING PORTION

This application claims the priority of International Application No. PCT/EP2012/076774, filed Dec. 21, 2012, and German Patent Document No. 10 2011 089 546.9, filed Dec. 22, 2011, the disclosures of which are expressly incorporated by reference herein.

TECHNICAL FIELD

The present invention relates to a drill bit having an exchangeable drill bit section.

PRIOR ART

Drill bits consist of a cutting section with one or more cutting segments, a drill shaft section and a receiving section with a plug-in end. The drill bit is, by means of the plug-in end, fastened in a tool receptacle of a drilling machine and is rotated by the drilling machine about a drilling axis during drilling operation. Known drill bits are differentiated according to drill bits having a replaceable drill bit section and drill bits without a replaceable drill bit section. The term "drill bit section" is understood to refer to the individual sections of the drill bit, which may be designed as the cutting section, the drill shaft section and the receptacle section.

EP 0 428 476 A1 discloses drill bits, in which the worn cutting section is removed and replaced by a new cutting section. The drill shaft section and the cutting section are joined together by means of a combined plug-and-solder connection. The term "combined plug-and-solder connection" refers to connections of two connecting elements, which first form a form-fitting plug connection in at least one direction, and then the connecting elements, having been plugged together, are soldered to one another. The cutting section has a first outer connecting element, designed as a shell, and the drill shaft section has a second inner connecting element, designed as a plug. The connecting elements are plugged into one another and then joined together. The inner connecting element is 2% to 10% longer than the outer connecting element and, at one end face, is in contact with a contact face of the outer connecting element. There is a gap, filled with solder, between the connecting elements that have been plugged into one another. The solder melts by heating up the connecting elements and forms a soldered connection between the connecting elements.

US 2010/200304 A1 discloses another known drill bit, consisting of a replaceable cutting section, a drill shaft section and a receptacle section, wherein the cutting section and the drill shaft section are joined together by means of a combined plug-and-solder connection. The cutting section comprises an open ring section and multiple cutting segments, which are fixedly connected to the ring section. Deviations in dimensions of the drill shaft section can be compensated by the open ring section with a narrow gap. The drill shaft section comprises an inner connecting element, which is designed as a plug, and the cutting section comprises an outer connecting element, which is designed as a shell, so that one is inserted into the other and then they are soldered together. The ring section has multiple continuous boreholes along the circumference, each being situated at least partially in the outer connecting element. The boreholes support the distribution of solder through capillary action into the interspaces between the inner and outer connecting elements.

The known drill bits having a replaceable drill bit section have a first drill bit section with a first connecting element and a second drill bit section with a second connecting element, wherein the first and second connecting elements form a plug connection with an outer connecting element and an inner connecting element. The connecting elements are joined together in a physically bonded manner by means of a soldered connection. To replace a worn cutting section, the soldered connection between the drill shaft section and the worn cutting section is destroyed in the case of the known drill bits having a combined plug-and-solder connection, a new cutting section is placed on the drill shaft section, and the drill shaft section and the new cutting section are soldered to one another. The drill bits with a combined plug-and-solder connection have the disadvantage that a heat source and/or a soldering device are necessary for destroying the soldered connection between the worn cutting section and the drill shaft section and for creating a new soldered connection between the new cutting section and the drill shaft section. Therefore, the known drill bits are not suitable for rapid replacement of the cutting section at the construction site.

A soldered connection between the drill shaft section and the cutting section has another disadvantage. The cutting segments are frequently connected to the ring section by soldering, and the soldered connection to the cutting segments can be released by heating the connecting element in soldering the cutting section. The ring section must have a certain height to be sure that, in soldering the connecting elements, the heat influence zone does not include the cutting segments. On the other hand, the ring section should be as narrow as possible to reduce the cost of a cutting section. The ring section is discarded when the cutting section is replaced, and the additional material costs for a higher ring section accrue for each cutting section.

DESCRIPTION OF THE INVENTION

The object of the present invention is thus to further develop a drill bit having a replaceable cutting section in order to reduce the equipment costs for the user in replacement of the cutting section. Furthermore, when replacing a cutting section, one should reduce the risk that the connection of the cutting segments to the ring section is damaged due to the connection of the cutting section to the drill shaft section.

According to the invention, it is provided that the first plug-connecting element and the second plug-connecting element can be connected by pin connection. The cutting section and the drill shaft section can be secured to prevent twisting and displacement relative to one another by means of the additional pin connection. A pin connection has the advantage that it can be designed to be releasable, so that the user can replace a drill bit section with little effort.

A plug connection is defined as a connection, in which two connecting elements, which are referred to as the first and second plug-connecting elements, are guided along a plug-in direction and form a form-fitting connection in at least one direction. A pin connection is defined as a connection in which two connection partners are joined together by a pin element. Pin elements also include screws and rivets, among other things. A screw in the sense of the present invention is a pin element having an outside thread that forms a force-fitting connection with a matching inside thread of a receiving bore. A rivet in the sense of the present invention is a plastically deformable pin element having a special head, wherein the rivet, after deformation, forms a force-fitting connection with a receiving bore, which is designed as a through-hole in the connecting elements.

In a preferred embodiment, the first and second plug-connecting elements form a plug connection with the outer plug-connecting element and an inner plug-connecting element. A plug connection with an inner and an outer plug-connecting element can be opened and closed easily by the user. Furthermore, the drill bit sections, which are joined by means of the plug-connecting elements, are aligned precisely with one another.

The outside diameter of the outer plug-connecting element is smaller than or equal to the outside diameter of a cutting circle formed by the cutting segments, and the inside diameter of the inner plug-connecting element is greater than or equal to the inside diameter of the cutting circle. The inside diameter and the outside diameter of the cutting circle determine the diameter of the borehole in the workpiece and the diameter of the drill plug. To ensure the functionality of the drill bit in core drilling in the workpiece, the combined plug-and-pin connection of the drill bit must not be smaller than the inside diameter of the cutting circle and must not be larger than the outside diameter of the cutting circle.

A recess that can be filled with an anticorrosion agent is preferably provided in the first plug-connecting element and/or in the second plug-connecting element of the plug connection. The plug connection is held slidingly by the recess by the anticorrosion agent and its functionality is improved. The anticorrosion agent is important in particular when a cooling and drilling fluid is used in core drilling, because it can lead to corrosion between the connecting elements and thus limit the releasability of the plug connection.

The pin connection preferably has at least one receiving bore and at least one pin element, such that the pin element can be inserted into the receiving bore. The geometry of the receiving bores and that of the pin element are coordinated with one another. The pin elements are designed to be cylindrical, for example, with a round or elliptical cross section or a conical taper.

The at least one receiving bore is in particular preferably as deep as or deeper than the at least one pin element. This design of the receiving bore ensures that the pin elements do not protrude with respect to the inside or the outside of the drill shaft section.

In a first embodiment, the pin element is designed to be loose, and the receiving bore passes completely through one of the plug-connecting elements and at least partially through the other plug-connecting element. A pin element that is designed to be loose can be replaced easily by a new pin element.

In a first variant, the receiving bore does not pass completely through the other plug-connecting element. The pin element is prevented from falling out due to the fact that the receiving bore penetrates only partially and not completely through the plug-connecting element. Furthermore, the bottom of the receiving bore may serve as a mating face for the pin element for a magnetic pin connection.

The other plug-connecting element in particular preferably has an opening, which connects the receiving bore to the inside or the outside of the drill bit section, wherein the opening is designed to be smaller than the receiving bore. The pin element is accessible from the inside or the outside of the drill bit section through the opening and can be removed from the receiving bore with a suitable tool, so that the pin connection can easily be released by the user.

In a second variant, the receiving bore penetrates completely through the other plug-connecting element. Continuous receiving bores have the advantage that the receiving bores are accessible from the inside or the outside and the pin connections can easily be released by the user. The receiving bore preferably has a tapering conical shape. Due to the conical shape of the receiving bores and the pin elements, there is no risk that the pin elements will slip through to the inside or the outside.

In a preferred variant, the pin connection is designed as a releasable connection. A connection is defined as being releasable if the connection can be released by the user without destroying it such as a plug connection, a screw connection or a magnetic connection.

The pin connection is in particular preferably designed as a magnetic pin connection, wherein the pin element or one of the plug-connecting elements is designed as a permanent magnet. If the pin element is designed as a permanent magnet, the plug-connecting element must be ferromagnetic, and if the plug-connecting element is designed as a permanent magnet, the pin element must be ferromagnetic. Magnetic pin connections have the advantage that the pin elements are reusable and the pin elements create a known retaining force. In the case of a magnetic pin connection, the user can easily and quickly replace one drill bit section with a new drill bit section. To remove the old drill bit section, the pin elements are removed from the receiving bores and the plug connection is released between the drill bit sections. The drill bit sections are inserted one into the other, and the pin elements, which are designed as permanent magnets, are inserted into the through-bores of the outer plug-connecting element. Next, the outer plug-connecting element is rotated about the inner plug-connecting element until the pin elements engage in the receiving bores of the inner plug-connecting element. Because of the magnetic forces involved, the engagement of the pin elements is audible for the user. The magnetic pin connections have the advantage that the boreholes in the inner and outer plug-connecting elements need not be aligned accurately with one another by the user when replacing a drill bit section, but instead, accurate alignment is accomplished by rotation of the drill bit section and engagement of the pin elements in the receiving bores.

The pin elements can preferably be clamped in the receiving bores. The receiving bore here is preferably designed as a transverse slot of various widths, and the pin element is inserted into the transverse slot. By means of a rotational movement about the drilling axis, the pin element is rotated in the transverse slot until the pin element is clamped in the transverse slot. The pin element may also be designed with a first step and a second step. The pin element is inserted with the largest step into the receiving bore and is clamped in the receiving bore with the small step.

The magnetic pin elements can preferably be combined with the clampable pin elements. This combination is suitable for applications of the drill bit in which the magnetic force is greatly reduced due to high temperatures, for example. In this case, the clamped pin element secures the cutting section on the drill shaft section. The magnetic design of the pin element has the advantage that the pin element is secured on insertion of the pin element into the receiving bore.

In an alternative embodiment, the pin element is secured on one of the plug-connecting elements, and the receiving bore passes completely through the other plug-connecting element. Then the pin element can be clamped in the receiving bore. The receiving bore is preferably designed as a transverse slot of various widths. The pin element is inserted into the transverse slot and rotated by a rotational movement about the drilling axis until the pin element is clamped in the transverse slot.

The receiving bore is preferably connected to a connecting slot in the plug-connecting element, wherein the receiving bore and the connecting slot are designed in the form of a T-shaped groove. To be able to insert the pin element into the receiving bore, a connecting slot, which is connected to the receiving bore, is provided in the plug-connecting element. The receiving bore and the connecting slot are designed in the form of a T-shaped groove. The T-shaped groove has the advantage over an L-shaped groove in that it reduces the risk of unintentional loosening of the cutting section. When a drill bit has become clamped in the substrate, the user attempts to loosen the drill bit from the substrate by moving it back and forth about the drilling axis.

A guide section is preferably provided between the cutting segments and the drill shaft section, wherein the guide section is connected to the cutting segments, so that it is at least partially flush with the inside and/or the outside. Due to the flush connection of the guide section to the cutting segments, the guide section forms a guide for the cutting segments when drilling with the drill bit and thereby stabilizes the cutting segments. The cutting segments can be guided by means of the guide section on the outside of the drill bit over the substrate surrounding the borehole or over the drill core on the inside of the drill bit.

The guide section is in particular preferably mounted on a replaceable drill bit section. In a first variant, the guide section is connected to the cutting segments in such a way that it is at least partially flush with the outside and is designed at least partially as an outer plug-connecting element of the plug connection. In an alternative variant, the guide section is connected to the cutting segments in such a way that it is at least partially flush with the inside and is designed at least partially as an inner plug-connecting element of the plug connection.

EXEMPLARY EMBODIMENTS

Exemplary embodiments of the invention are described below with reference to the drawings. These exemplary embodiments are not necessarily drawn to scale and instead the drawings are presented in a schematic and/or slightly distorted form in cases where this serves the purpose of illustration. With regard to supplements to the teachings that are directly discernible from the drawings, reference is made to the relevant prior art. It should be taken into account here that, without going beyond the general idea of the invention, various modifications and changes are possible with regard to the shape and details of an embodiment. The features of the invention that are disclosed in the description, the drawings and the claims may be essential to the refinement of the invention, either individually or in any combination. Furthermore, all combinations of at least two of the features disclosed in the description, the drawings and/or the claims fall within the scope of the invention. The general idea of the invention is not limited to the precise shape or the details of the embodiments described below and those described as being preferred, nor is it limited to one object that would be restricted in comparison with the object claimed in the claims. In the case of the given dimension ranges, values within the aforementioned limits should also be disclosed as limit values and may be used and claimed in any form. For the sake of simplicity, the same reference notation is used below for identical or similar parts or for parts having an identical or similar function.

DETAILED DESCRIPTION OF THE DRAWINGS

Figure 1:
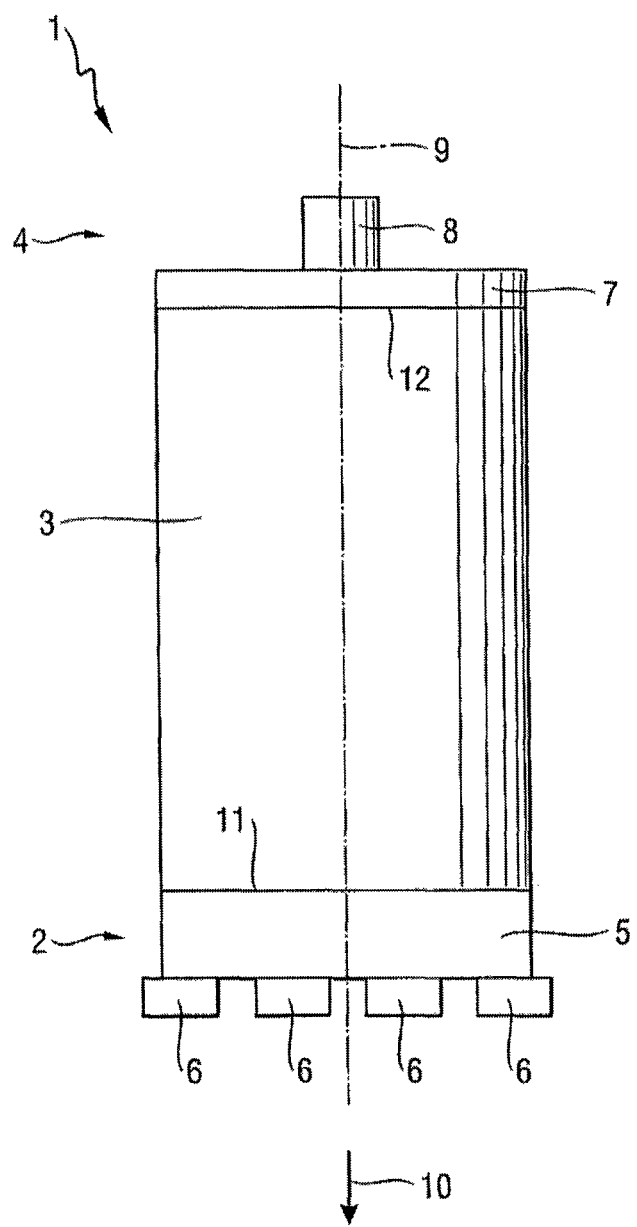
FIG. 1 illustrates a first embodiment of a drill bit according to the invention, consisting of a cutting section, a drill shaft section and a receiving section, wherein the drill shaft section is connected to the cutting section and the receiving section by means of releasable connections.

FIG. 1 shows a first embodiment of a drill bit 1 according to the invention, consisting of a cutting section 2, a drill shaft section 3 and a receiving section 4. The cutting section 2 comprises a cylindrical ring section 5 and multiple cutting segments 6, which are connected to the ring section 5. The cutting segments 6 are welded, soldered or screwed to the ring section 5 or connected to the ring section 5 by some other suitable means of connection. The receiving section 4 comprises a cover 7 and a plug-in end 8, by means of which the drill bit 1 is fastened in a tool receptacle of a drilling machine. During drilling operation the drill bit 1 is rotated by the drilling machine about a drilling axis 9, and in the case of a hand-guided drilling machine, the user moves the drill bit by hand, or in the case of a stand-guided drilling machine, the drill bit is moved by a forward feed unit in a drilling direction 10 parallel to the drilling axis 9 in the substrate to be machined.

The cutting section 2 is connected to the drill shaft section 3 by means of a first connection 11, and the drill shaft section 3 is connected to the receiving section 4 by means of a second connection 12. The first and second connections 11, 12 are designed as releasable connections. A connection is defined as being releasable if the connection can be released by the user without destruction, such as, for example, a plug-in connection, a screw connection or a magnetic connection. A connection is defined as being nonreleasable if the user can release the connection only by destroying the connecting means, such as, for example, a soldered connection, a welded connection, a riveted connection or an adhesively bonded connection.

In the embodiment illustrated in FIG. 1, the first and second connections 11, 12 are designed as releasable connections, which connect a first drill bit section 2, 3 to a second drill bit section 3, 4. For the first connection 11, the cutting section 2 forms a first drill bit section, and the drill shaft section 3 forms a second drill bit section. For the second connection 12, the drill shaft section 3 forms a first drill bit section, and the receiving section 4 forms a second drill bit section.

The cutting section 2 comprises the cylindrical ring section 5, to which several cutting segments 6 are attached in the embodiment illustrated in FIG. 1. Instead of having a plurality of cutting segments 6, the cutting section 2 may also have a single cutting segment, which is designed as a cutting shell and is connected to the ring section 5. Furthermore, the cutting section 2 may consist of multiple subsections, wherein each subsection has a ring section in the form a cylindrical section having at least one cutting segment 6 and is connected to the drill shaft section 3.

Figure 2A:
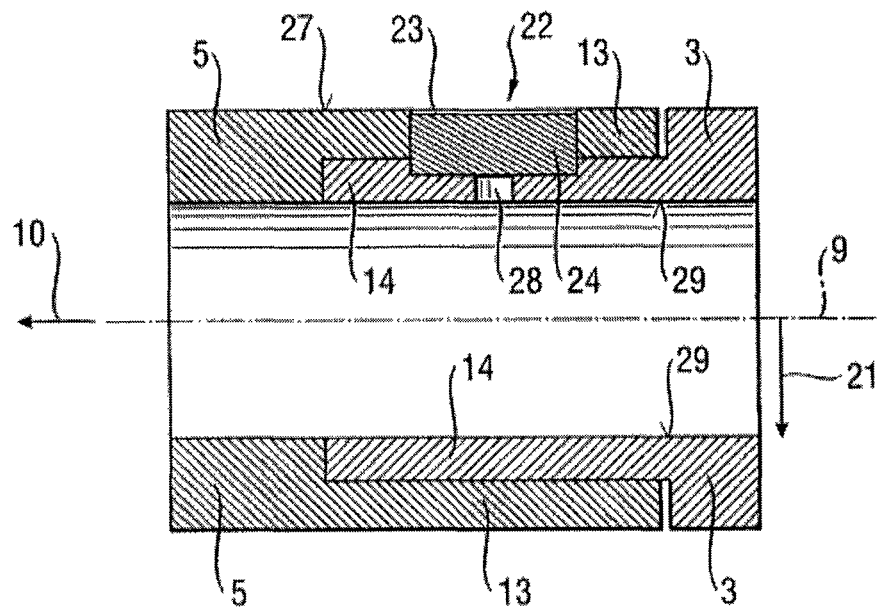
FIGS. 2A, B illustrate the connection designed as a plug connection between the cutting section and the drill shaft section of the drill bit shown in FIG. 1 in a longitudinal section parallel to the drilling axis in the condition after joining (FIG. 2A) and the connecting elements of the plug connection in an exploded diagram (FIG. 2B)
Figure 2B:
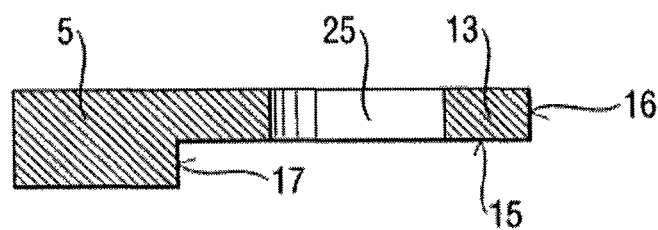
Figure 2B:
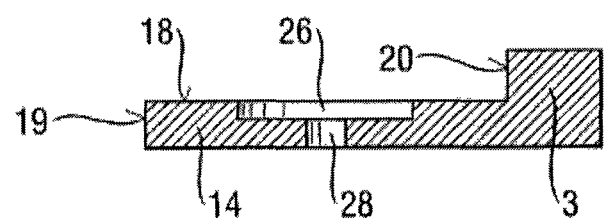

FIGS. 2A, B show the first connection 11 of the drill bit 1, which connects the cutting section 2 releasably to the drill shaft section 3 in a longitudinal section parallel to the drilling axis 9, wherein FIG. 2A shows the connection in the plugged state, and FIG. 2B shows the connecting elements in an exploded diagram.

The first connection 11 between the cutting section 2 and the drill shaft section 3 is designed as a plug connection with a first plug-connecting element 13, which is designed as a shell, and a second plug-connecting element 14, which is designed as a plug. The first plug-connecting element 13 is provided on the ring section 5 of the cutting section 2 and is designed monolithically with the ring section 5. The second plug-connecting element 14 is provided on the drill shaft section 3 and is designed monolithically with the drill shaft section 3. As an alternative to the monolithic design, the plug-connecting elements 13, 14 may also be designed as separate parts and then connected to the ring section 5 and/or to the drill shaft section 3.

The drill shaft section 3 is inserted with the plug 14 into the shell 13 of the cutting section 2. The shell 13 has an outer lateral surface 15, an end face 16 and a contact surface 17, and the plug 14 has an internal lateral surface 18, an end face 19 and a contact surface 20. The plug 14 is designed to be longer than the shell 13. This difference in length between the plug-connecting elements 13, 14 ensures that the end face 19 of the plug 14 is in contact with the contact surface 17 of the shell 13.

When plugged-in, the drill shaft section 3 with the end face 19 is in contact with the contact surface 17 of the cutting section 2. The inner lateral surface 15 of the shell 13 and the outer lateral surface 18 of the plug 14 form a clearance fit. The smaller the difference between the diameters of the lateral surfaces 15, 18, the more accurate is the alignment of the cutting section 2 with the drilling axis 9. On the other hand, the clearance between the shell 13 and the plug 14 must be large enough that the user can remove the cutting section 2 manually from the drill shaft section 3.

The first and second plug-connecting elements 13, 14 are joined together in a radial direction 21 perpendicular to the drilling axis 9 by means of a securing device 22 designed as a releasable pin connection. The pin connection 22 comprises a plurality of receiving bores 23 and securing elements 24, which are designed as pin elements that are inserted into the receiving bores 23. Each receiving bore 23 consists of a through-bore 25, which passes completely through the shell 13, and a blind hole 26, which passes partially through the plug 14. The receiving bore is designed as a blind hole 26 in the plug 14 to prevent slipping of the pin element 24 toward the inside of the drill bit.

The first connection 11 must join the cutting section 2 and the drill shaft section 3 to one another in all translatory and rotational directions. The replaceable cutting section 2 must be secured against translatory movement in the drilling direction 10, opposite the drilling direction 10 and radially to the drilling direction 10 as well as against rotation about the drilling axis 9. The plug-connecting elements 13, 14 secure the cutting section 2 against translation in the direction opposite the drilling direction 10 and radially to the drilling direction 10. The pin connection 22 prevents rotation about the drilling axis 9 and translation in the drilling direction 10. For the pin connection 22, there is the additional requirement that the pin element 24 must be securely affixed in the receiving bore 23 during drilling operation and must not be released from the receiving bore 23. If the pin element 24 is to be released from the receiving bore 23 during drilling operation, then the cutting section 2 is not secured against translation in the drilling direction 10 or rotation about the drilling axis 9.

To reduce the danger that the pin elements 24 may be released due to the centrifugal forces in a drilling operation in a rotation about the drilling axis 9 and then fall out of the receiving bore 23, an additional retainer is provided for the pin elements 24. This retainer may be formed by adhesive bonding or soldering of the pin elements 24 in the receiving bore 23, for example, or the pin elements may be designed as magnetic pin elements, screws or rivets. Alternatively, the pin elements 24 may be secured in the receiving bores 23 by means of additional elements, such as adhesive tape or a spring ring. The adhesive tape and the spring ring will then function as retaining elements.

A screw is a pin element 24 having an outside thread that cooperates with a matching inside thread on the receiving bore 23. The additional thread connection secures the pin element 24 in the receiving bore 23. A rivet is a plastically deformable pin element, which is referred to as a rivet shaft, having a swage head and a closing head. The rivet is inserted into the receiving bore designed as a through-bore in the plug-connecting elements until the swage head comes in contact with the plug-connecting element. Next, the protruding end is shaped by the action of pressure, for example, by a hammer strike or by a press, to form the closing head. To shape the closing head, it is advantageous if the swage head is resting on the inside and the closing head on the outside of the drill bit. The swage head may have different head shapes, for example, a countersunk head, a mushroom head or a counterbore head. A receiving section for the swage head adapted to the shape of the head may be provided on the inner plug-connecting element with which the swage head is in contact.

In the case of a magnetic pin connection, the bottom of the blind hole 26 forms a magnetic mating surface to the pin element 24. The pin element 24 is designed as a permanent magnet and the plug 14 is ferromagnetic or the plug 14 is designed as a permanent magnet and the pin element 24 is ferromagnetic. The shell 13, which is connected to the plug 14 by means of the pin connection 22 may be made of a ferromagnetic material or some other material, e.g., plastic.

The diameter of the securing elements 24 and the respective receiving bores 23 are coordinated with one another. The receiving bores 23 are designed to be as deep as or deeper than the securing elements 24. This ensures that the securing elements 24 will not protrude with respect to the outside 27 of the shell 13. The securing elements 24 are designed as magnetic cylinder pins, wherein the strength of the magnetic force is adapted to the processing parameters of the drilling machine. The receiving bore 23 is connected to the inside 29 of the drill shaft section 3 by means of an opening 28. The securing element 24 is accessible from the inside 29 by means of the opening 28 and can be pressed out of the receiving bore 23 with a suitable tool, for example, so that the pin connection can be released easily.

A cutting section 2 in which the cutting segments 6 are worn can be replaced easily and quickly with a new cutting section 2. To remove the worn cutting section 2, the securing elements 24 are removed from the receiving bores 23 and the worn cutting section 2 is removed from the drill shaft section 3. The drill shaft section 3 is placed with the plug 14 on the shell 13 of the new cutting section 2, and the pin elements 24 are inserted into the through-bores 25 of the new cutting section 2. Then the new cutting section 2 is rotated about the drill shaft section 3 until the pin elements 24 have engaged in the blind holes 26 of the drill shaft section 3. Engagement of the securing elements 24 in the blind holes 26 of the drill shaft section 3 is audible for the user because of the magnetic forces. The magnetic connection exists between the pin elements 24 and the bottom of the blind hole 26.

Figure 3A:
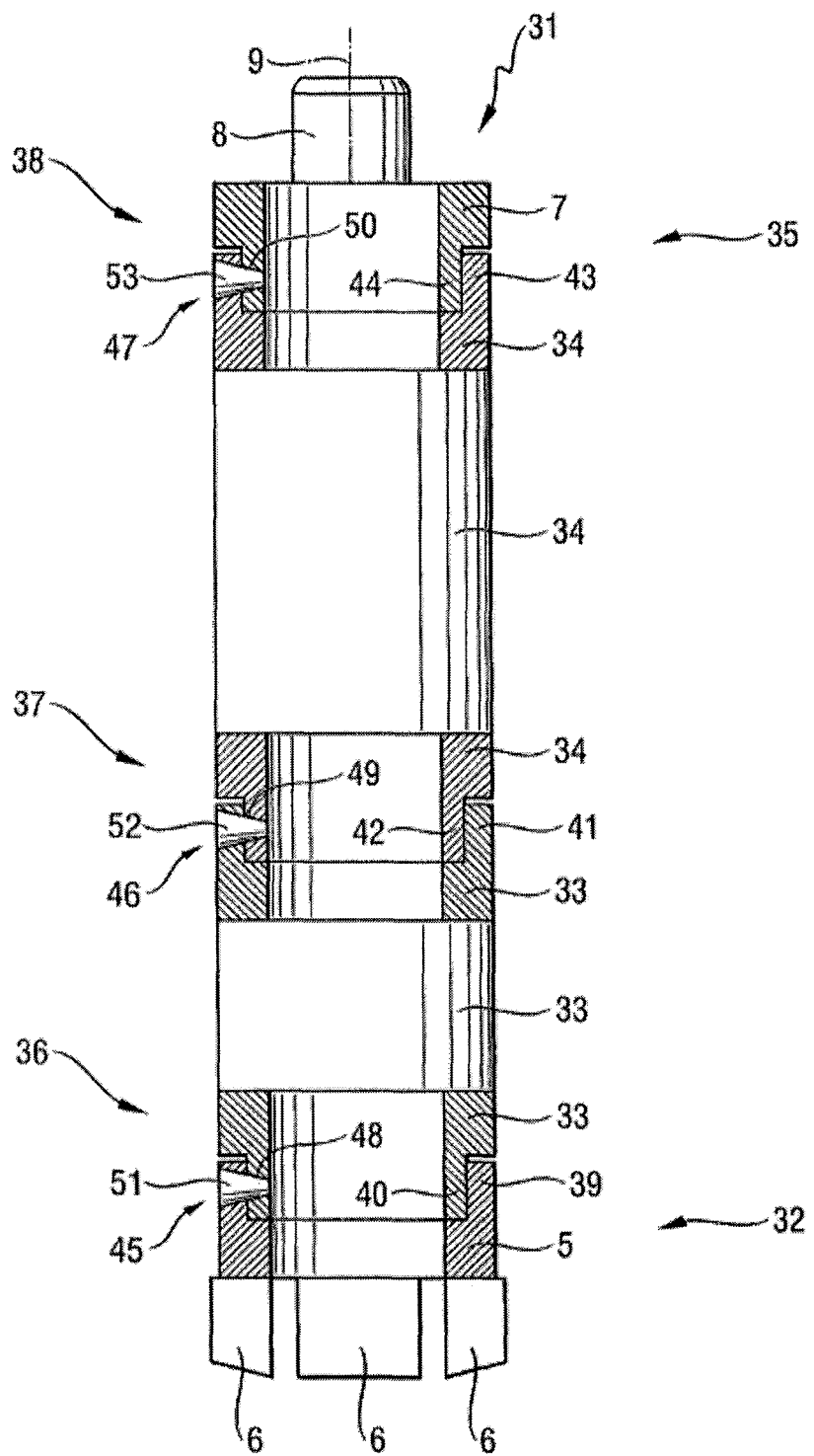
FIGS. 3A, B illustrate a second embodiment of a drill bit according to the invention consisting of a cutting section, a first and a second drill shaft section and a receiving section, which are joined together by means of plug connections with safety devices (FIG. 3A), as well as a set of multiple drill bit sections (FIG. 3B)

FIG. 3A shows a second embodiment of a drill bit 31 according to the invention, consisting of a cutting section 32, a first and second drill shaft section 33, 34 and a receiving section 35. The cutting section 32 is connected to the first drill shaft section 33 by means of a first releasable connection 36; the first drill shaft section 33 is connected to the second drill shaft section 34 by means of a second releasable connection 37, and the second drill shaft section 34 is connected to the receiving section 35 by means of a third releasable connection 38.

The releasable connection 38 between the drill shaft section 34 and the receiving section 35 offers the user the possibility of loosening the receiving section 35 when removing the drill core and removing the drill core from the drill shaft section 34. Furthermore, receiving sections 35 may be provided with various plug-in ends 8, so that the drill bit 31 is suitable for drilling machines having various tool receptacles.

The connections 36-38 are designed as releasable connections which connect a first drill bit section 32, 33, 34 to a second drill bit section 33, 34, 35. For the first connection 36, the cutting section 32 forms a first drill bit section, and the first drill shaft section 33 forms a second drill bit section; for the second connection 37 the first drill shaft section 33 forms a first drill bit section and the second drill shaft section 34 forms a second drill bit section; and for the third connection 38, the second drill shaft section 34 forms a first drill bit section and the receiving section 35 forms a second drill bit section.

The cutting section 32, like the cutting section 2 of the drill bit 1, consists of the ring section 5 and several cutting segments 6, which are welded or soldered to the ring section 5 or connected by some other fastening method. The receiving section 35, like the receiving section 4 of the drill bit 1, comprises the cover 7 and the plug-in end 8 by means of which the drill bit 31 is secured in the tool receptacle of a drilling machine.

On the side facing away from the cutting segments 6, the cutting section 32 has a first outer plug-connecting element 39, which is designed as a shell and together with a second inner plug-connecting element 40, which is designed as a plug of the first drill shaft section 33, forms the first plug connection 36. The first drill shaft section 33 has a first outer plug-connecting element 41, which is designed as a shell on the side facing away from the cutting segments 6, forming the second plug connection 37, together with a second inner plug-connecting element 42 of the second drill shaft section 34, which is designed as a plug. On the side facing away from the cutting segments 6, the second drill shaft section 34 has a first outer plug-connecting element 43, which is designed as a shell and together with a second inner plug-connecting element 44 of the receiving section 35 designed as a plug forms the third plug connection 38.

The plug connection 36-38 between the sections 32-35 of the drill bit 31 additionally have securing devices 45, 46, 47, which are designed as pin connections and prevent rotation of the sections 32-35 about the drilling axis 9 and displacement of the sections 32-35 along the drilling axis 9. The securing devices 45-47 each comprise multiple receiving bores 48, 49, 50 and pin elements 51, 52, 53, which are inserted into the receiving bores 48-50.

The receiving bores 48-50 are designed as through-bores which pass completely through the plug-connecting elements 39-44 and have a conical shape that tapers inward. Due to the conical shape of the receiving bores 48-50 and the pin elements 51-53, there is no risk that the pin elements 51-53 can slip inward. The continuous receiving bores 48-50 have the advantage that the receiving bores 48-50 are accessible from the inside and the pin connections 45-47 can be released easily by the user. To reduce the risk that the pin elements 51-53 will be released by rotation about the drilling axis 9 by the centrifugal forces, the pin elements 51-53 may be glued, soldered or screwed in the receiving bores 48-50.

The receiving bores 48-50 in the plug-connecting elements 39-44 and the securing elements 51-53 are similar in design in the embodiment shown in FIG. 3 for the first, second and third connections 36-38 so that each first plug-connecting element 39, 41, 43 can be connected to each second plug connection 40, 42, 44, i.e., the cutting section 32 can be connected to the first drill shaft section 33, the second drill shaft section 34 or the receiving section 35.

Figure 3B:
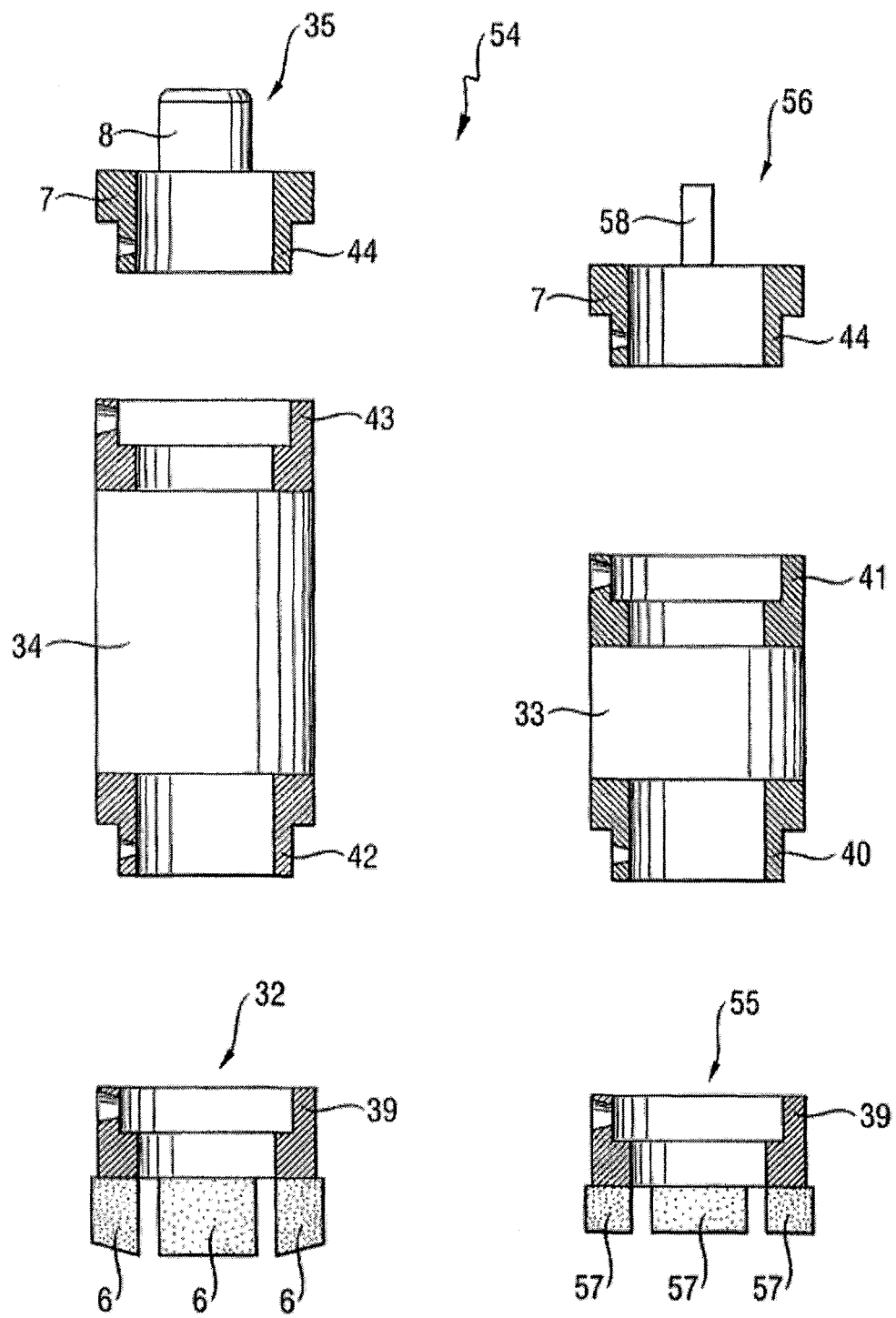

FIG. 3B shows a set 54 of drill bit sections comprising another cutting section 55 and another receiving section 56 in addition to the drill bits 32-35 of the drill bit 31 shown in FIG. 3A.

The additional cutting section 55 differs from the cutting section 32 in the design of the cutting segments 57, for example, due to the shape and/or material. The cutting section may be adapted to various substrates by means of the design of the cutting segments. This set 54 may additionally have other cutting sections 32, 55, which serve as a replacement for worn cutting sections 32, 55. The additional receiving section 56 differs from the receiving section 35 through the plug-in end 58 so that a drill bit for drilling machines can be designed with various tool receptacles.

The set 54 of drill bit sections 32-35 shown in FIG. 3B offers the user the possibility of assembling four drill bits of different lengths. The first and shortest drill bit consists of the cutting section 32 and the receiving section 35; the second drill bit consists of the cutting section 32, the first drill shaft section 33 and the receiving section 35; the third drill bit consists of the cutting section 32, the second drill shaft section 34 and the receiving section 35; and the fourth longest drill bit consists of the cutting section 32, the first and second drill shaft sections 33, 34 and the receiving section 35.

Figure 4A:
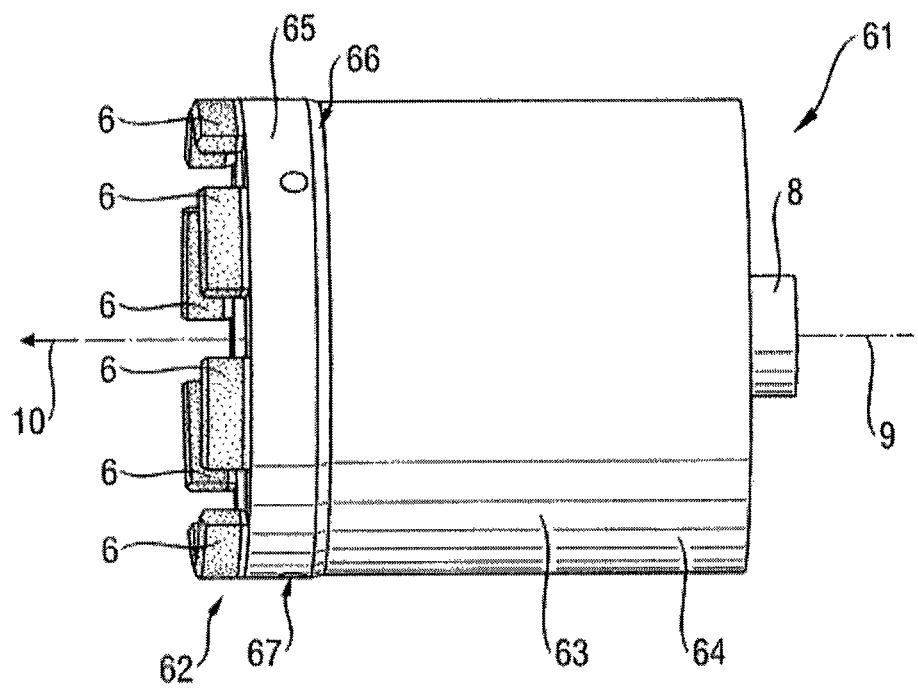
FIGS. 4A, B illustrate a third embodiment of a drill bit according to the invention with a replaceable cutting section, which is connected to a drill shaft section by means of a plug connection (FIG. 4A) and the connection between the drill shaft section in a longitudinal section parallel to the drilling axis (FIG. 4B).

FIG. 4A shows a third embodiment of a drill bit 61 according to the invention, consisting of a replaceable cutting section 62, a drill shaft section 63 and a receiving section 64 in a three-dimensional diagram.

The cutting section 62 comprises a ring section 65, which is connected to multiple cutting segments 6 and is connected to the drill shaft section 63 by means of a releasable connection 66. The connection 66 is designed as a plug connection, consisting of a first and a second plug-connecting element in the direction of the drilling axis 9, wherein the plug-connecting elements are secured in the radial direction perpendicular to the drilling axis 9 by means of a securing device 67 to prevent rotation about the drilling axis 9 and to prevent displacement along the drilling axis 9.

Figure 4B:
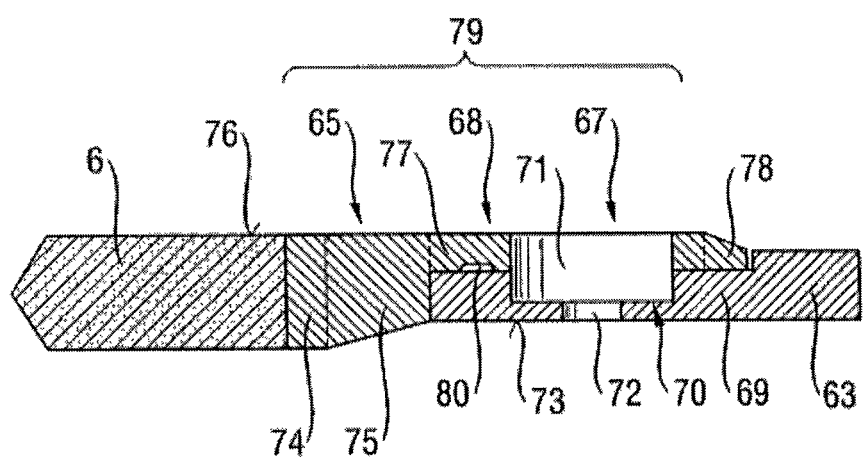

FIG. 4B shows the connection 66 between the cutting section 62 and the drill shaft section 63 in a longitudinal section parallel to the drilling axis 9. The connection 66 comprises a first outer plug-connecting element 68, which is designed as a shell and is provided on the cutting section 62, and a second inner plug-connecting element 69, which is designed as a plug and is provided on the drill shaft section 63. The securing device 67 is designed as a pin connection, consisting of multiple receiving bores 70 and pin elements 71, which are inserted into the receiving bores 70. The receiving bores 70 are connected to the inside 73 by means of an opening 72.

The design of the ring section 65 and that of the first outer plug-connecting element 68 differ from the design of the ring section 5 and that of the first plug-connecting element 13 of the drill bit 1. The ring section 65 is designed in two parts—in contrast with the ring section 5 of the drill bit 1—and consists of a first ring section 74 with a constant inside diameter and a second ring section 75 with an inside diameter that decreases in the direction of the cutting segments 6. The second ring section 75 serves to support the removal of the drill bit and is also referred to as the core-removing section. The first and second ring sections 74, 75 each have a constant outside diameter. The ring section 65 is connected to the cutting segments 6 so that it is flush on the outside 76. Due to the fact that the ring section 65 on the outside 76 is connected to the cutting segments 6 so that it is flush with them, the ring section 65 forms a guide for the cutting segments 6 in drilling with the drill bit 61 and thus stabilizing the cutting segments 6.

The first plug-connecting element 68, which is designed as a shell is designed in two parts in contrast with the first plug-connecting element 13 of the drill bit 1 and consists of a first section 77 with a constant outside diameter and a second section 78 with an outside diameter that decreases in the direction of the drill shaft section 63. The drill shaft section 63 has an outside diameter smaller than the desired borehole diameter. In drilling with the drill bit 61, a gap must remain between the borehole and the drill shaft section 63 so that cooling fluid and drilling fluid can be transported through this gap.

The first section 77 of the shell 68 has an outside diameter that corresponds to the desired borehole diameter so that the first section 77 in drilling with the drill bit 61 also forms a guide for the cutting segments 6, and stabilizes the cutting segments 6. The ring section 65 and the first section 77 of the shell 68 are referred to jointly as the guide section 79. The guide section 79 and the second section 78 of the shell 68 are designed to be monolithic. As an alternative to the monolithic design, the sections 74, 75, 77, 78 may be designed as separate parts and then connected.

The guide section 79 is part of the replaceable cutting section 62 and is worn due to friction in machining with the drill bit 61 from the substrate to be drilled. Arranging the guide section 79 on the replaceable cutting section 62 has the advantage that the guide section 79 is replaced regularly and good guidance properties are ensured for the cutting segments 6. The height of the guide section 79 is selected so that, on the one hand, the cutting segments 6 are guided in drilling and, on the other hand, the cooling and drilling fluid can be transported in the borehole.

To maintain the functionality of the plug connection 66, the first plug-connecting element 68 has a recess 80, which is filled with an anticorrosion agent before assembling the drill bit 61. Alternatively or additionally, a recess which holds an anticorrosion agent may be provided in the second plug-connecting element 69.

FIGS. 4A, B show an embodiment of a drill bit 61 on which the cutting section 62 has a core removing section 75 and a transition section 78. The design of the core-removing section 75 on the inside 73 of the cutting section 62 has no effect on the guidance properties of the guide section 79. Alternatively, the core-removing section 75 may be provided at a different location on the cutting section 62 or the drill bit 61 may not have a core-removing section. A beveled transitional section 78 has the advantage that when a drill bit becomes clamped in the borehole, it can be removed from the borehole more easily because of the lower resistance.

The drill bits 1, 31, 61 illustrated in FIGS. 1, 3A and 4A have a circular cross section perpendicular to the drilling axis. Alternatively, drill bits according to the invention may have other suitable cross sections, such as a polygonal cross section, for example.

The invention claimed is:

1. A drill bit which is rotatable about a drilling axis, comprising:
    a cutting section having one or more cutting segments and a first plug-connecting element; and
    a drill shaft section having a second plug-connecting element,
    wherein the first plug-connecting element and the second plug-connecting element form a plug connection with an outer plug-connecting element and an inner plug-connecting element, wherein the inner plug-connecting element is closer to the drilling axis than the outer plug-connecting element and the outer plug-connecting element is farther away from the drilling axis than the inner plug-connecting element in a plane perpendicular to the drilling axis,
    wherein the first plug-connecting element and the second plug-connecting element are connectable by a pin connection, wherein the pin connection has at least one receiving borehole and at least one pin element which is insertable into the at least one receiving borehole,
    wherein the at least one pin element is a loose pin element and the at least one receiving borehole passes completely through one of the first and second plug-connecting elements and passes at least partially through another of the first and second plug-connecting elements, and
    wherein the at least one receiving borehole is at least as deep as the pin element.

2. The drill bit according to claim 1, wherein the receiving bore does not pass completely through the other plug-connecting element.

3. The drill bit according to claim 2, wherein the other plug-connecting element has an opening which connects the receiving bore to an inside or an outside of the drill bit and wherein the opening is smaller than the receiving bore.

4. The drill bit according to claim 1, wherein the pin connection is a releasable connection.

5. The drill bit according to claim 1, wherein the at least one receiving borehole passes only partially through the other of the first and second plug-connecting elements, and wherein the pin connection is a magnetic pin connection and wherein a pin element or one of the first and second plug-connecting elements is a permanent magnet.

6. The drill bit according to claim 1, wherein the pin element is clampable in the receiving bore.

* * * * *